United States Patent
Lee et al.

(10) Patent No.: US 9,489,764 B2
(45) Date of Patent: Nov. 8, 2016

(54) METHOD OF GENERATING THREE-DIMENSIONAL (3D) VOLUMETRIC DATA

(71) Applicant: Samsung Electronics Co., Ltd., Suwon-si, Gyeonggi-do (KR)

(72) Inventors: Chang Kyo Lee, Yongin-si (KR); Byung In Yoo, Seoul (KR); Chang Kyu Choi, Seongnam-si (KR); Jae Joon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 13/858,336

(22) Filed: Apr. 8, 2013

(65) Prior Publication Data
US 2013/0271449 A1     Oct. 17, 2013

(30) Foreign Application Priority Data

Apr. 17, 2012 (KR) .................. 10-2012-0039788
Mar. 28, 2013 (KR) .................. 10-2013-0033739

(51) Int. Cl.
*G06T 15/00* (2011.01)
*G06T 15/08* (2011.01)
*G06T 13/40* (2011.01)

(52) U.S. Cl.
CPC .............. *G06T 15/08* (2013.01); *G06T 13/40* (2013.01)

(58) Field of Classification Search
None
See application file for complete search history.

(56) References Cited

U.S. PATENT DOCUMENTS

| | | | |
|---|---|---|---|
| 6,023,302 A * | 2/2000 | MacInnis et al. | 348/597 |
| 2005/0237328 A1* | 10/2005 | Guhring | 345/520 |
| 2006/0256112 A1* | 11/2006 | Heirich et al. | 345/427 |
| 2009/0096787 A1 | 4/2009 | Masumoto et al. | |
| 2009/0103793 A1* | 4/2009 | Borland et al. | 382/131 |
| 2009/0174729 A1 | 7/2009 | Matsumoto | |
| 2010/0022879 A1 | 1/2010 | Migita | |
| 2011/0074781 A1 | 3/2011 | Miyamoto | |
| 2011/0221743 A1* | 9/2011 | Keall et al. | 345/419 |
| 2011/0228976 A1 | 9/2011 | Fitzgibbon et al. | |
| 2012/0019517 A1* | 1/2012 | Corazza et al. | 345/419 |

FOREIGN PATENT DOCUMENTS

| KR | 10-2002-0073841 | 9/2002 |
|---|---|---|
| KR | 10-2010-0121767 | 11/2010 |

* cited by examiner

*Primary Examiner* — Barry Drennan
*Assistant Examiner* — Diana Hickey
(74) *Attorney, Agent, or Firm* — NSIP Law

(57) ABSTRACT

A method of generating three-dimensional (3D) volumetric data may be performed by generating a multilayer image, generating volume information and a type of a visible part of an object, based on the generated multilayer image, and generating volume information and a type of an invisible part of the object, based on the generated multilayer image. The volume information and the type of each of the visible part and invisible part may be generated based on the generated multilayered image which may be include at least one of a ray-casting-based multilayer image, a chroma key screen-based multilayer image, and a primitive template-based multilayer image.

17 Claims, 24 Drawing Sheets

300

400

1100

FIG. 12
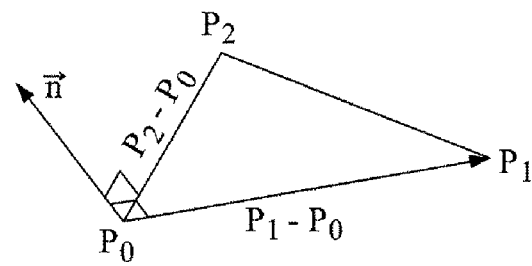
1210
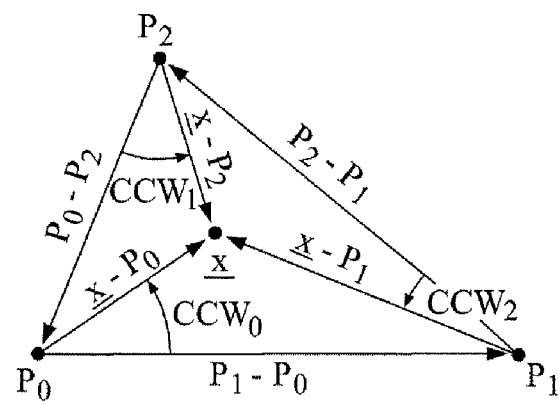
1220
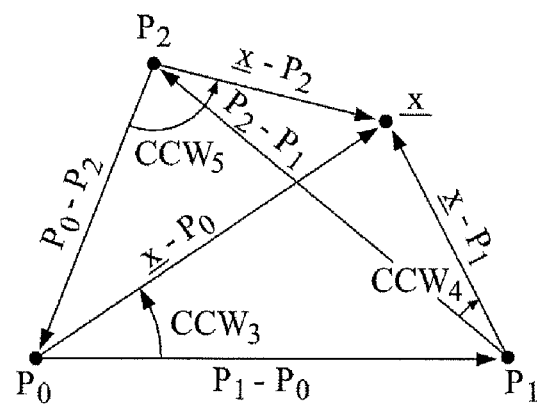
1230

| Object part ID | Red | Green | Blue |
|---|---|---|---|
| 1 | 50-55 | 70-80 | 100-110 |
| 2 | 150-162 | 244-255 | 51-75 |
| ⋮ | ⋮ | ⋮ | ⋮ |

| Object part | Width(x) | | Length(y) | | Depth(z) | | Height (h) | | Radius(r) | | Gaussian Parameter | |
|---|---|---|---|---|---|---|---|---|---|---|---|---|
| | Average | Standard deviation | Average | Standard deviation | Average | Standard deviation | Average | Standard deviation | Average | Standard deviation | Average | Standard deviation |
| Head (circle) | — | — | — | — | 20 | 1.9 | — | — | 20 | 2.5 | 1 | 1.1 |
| ... | ... | ... | ... | ... | ... | ... | ... | ... | ... | ... | ... | ... |
| Knee (rectangle) | 12 | 2.2 | 27 | 2.9 | 8 | 1.5 | — | — | — | — | 2 | 2.5 |

1900

2000

2100

2200

2400

METHOD OF GENERATING THREE-DIMENSIONAL (3D) VOLUMETRIC DATA

CROSS-REFERENCE TO RELATED APPLICATIONS

This application claims the priority benefit of Korean Patent Application No. 10-2012-0039788, filed on Apr. 17, 2012, and Korean Patent Application No. 10-2013-0033739, filed on Mar. 28, 2013, in the Korean Intellectual Property Office, the disclosures of which are incorporated herein by reference.

BACKGROUND

1. Field

Embodiments disclosed herein relate to a technology of generating three-dimensional (3D) volumetric data of an object that may be used as input data of learning of a recognizer for volume reconstruction of the object.

2. Description of the Related Art

A human may be well aware of a human body pose with a low resolution and at a long distance, because he or she uses both eyes in daily life. However, in a computer vision system, a method of recognizing a human body pose is required in various fields, but is regarded as a difficult unsolved issue.

Research and development on a technology of sensing a motion of a user and controlling a user interface is accelerating.

However, in a current motion sensing technology, only visible parts of an object may be recognized, and it is impossible to recognize hidden parts of the object caused by occlusion and the like. In addition, an application range may be limited to a human object (virtual body parts) and a depth image.

Conventionally, a motion of a human body is captured, and retargeting is performed on a three-dimensional (3D) object model, to generate body pose data of the 3D object model. However, 3D volumetric data based on a body type of a user may not be generated.

SUMMARY

In an aspect of one or more embodiments, there is provided a method of generating three-dimensional (3D) volumetric data including generating a multilayer image, generating volume information and a type of a visible part of an object, based on the generated multilayer image, and generating volume information and a type of an invisible part of the object, based on the generated multilayer image.

The multilayer image may be generated by generating motion data by capturing a motion of an object, generating a 3D object model, the 3D object model including a combination of 3D meshes based on a real body type of the object, performing retargeting to match the generated motion data to the generated 3D object model, and generating a ray-casting-based multilayer image, based on a result of the retargeting. The generating of the ray-casting-based multilayer image may further include generating a ray map based on ray casting, selecting a point from the generated ray map, and selecting a plurality of vertices from the generated 3D object model, and determining whether the multilayer image is stored, based on a location of the selected point and locations of the plurality of vertices. The determining of whether the multilayer image is stored may include determining whether the selected point is located within a range generated by the plurality of vertices.

The multilayer image may be generated by generating motion data by capturing a motion of an object, generating a 3D object model, the 3D object model including a combination of 3D meshes based on a real body type of the object, performing retargeting to match the generated motion data to the generated 3D object model, and generating a slicing-based multilayer image, based on a result of the retargeting. The generating of the slicing-based multilayer image based on the result of the retargeting may further include generating a primitive template 3D object model or a motion-augmented 3D object model based on the motion data and the 3D object model, generating labeled information and depth information, when a pixel corresponding to a current depth value exists in the generated motion-augmented 3D object model or the generated primitive template 3D object model, and generating the multilayer image, using the generated labeled information and the generated depth information.

The multilayer image may be generated by generating a color camera image from a chroma key screen and an object having different colors applied to a plurality of object parts, generating a red, green, blue (RGB) lookup table in which color patch information of the object and object part identification information are recorded, verifying color information of a current pixel of the generated color camera image, comparing the verified color information with the RGB lookup table, and searching for object part identification information corresponding to the color information, and generating the multilayer image, using the found object part identification information. The verifying of the color information of the current pixel of the generated color camera image, the comparing the verified color information with the RGB lookup table, and the searching for the object part identification information corresponding to the color information, may further include: reading R, G and B values of the current pixel of the generated color camera image, and verifying the color information, determining whether the read R, G and B values are identical to those of the chroma key screen, searching for object part identification information corresponding to the R, G and B values, based on the RGB lookup table, and storing the found object part identification information, when the read R, G and B values are determined to be different from those of the chroma key screen, and determining the verified color information to be a background color, when the read R, G and B values are determined to be identical to those of the chroma key screen.

The multilayer image may be generated by measuring an attribute value of each of a plurality of object parts, defining a primitive template based on the measured attribute value, and generating an object part lookup table based on the defined primitive template, generating motion capture data, using a motion capture system, matching the defined primitive template to each joint of the generated motion capture data, and receiving a depth camera image, generating an image within a selected depth range based on the received depth camera image, and generating a multilayer depth image and a multilayer labeled image from an image within the selected depth range.

The foregoing and/or other aspects are also achieved by providing a method of generating 3D volumetric data including reading a multilayer image, performing segmentation on the same object part identification information obtained from the read multilayer image, estimating a location corresponding to the same object part identification information, and generating skeleton information, using the estimated location.

The foregoing and/or other aspects are also achieved by providing a method of generating 3D volumetric data performed by generating, using a processor, a multilayer image by generating at least one of a ray-casting-based multilayer image, a slicing-based multilayer image, a chroma key screen-based multilayer image, and a primitive template-based multilayer image, generating volume information and an identification of a visible part of an object, based on the generated multilayer image, and generating volume information and an identification of an invisible part of the object, based on the generated multilayer image.

The visible part of the object may corresponds to a portion of the object visible formed on a sensor plane of an image sensor capturing the object, and the invisible part of the object may correspond to a portion of the object occluded from sensor plane of the image sensor capturing the object, wherein invisible data may be estimated from the visible data generated by the image sensor capturing the visible part of the object.

The generating of the multilayer image may include generating motion data by capturing a motion of an object, generating a 3D object model, the 3D object model including a combination of 3D meshes of the object, performing retargeting to match the generated motion data to the generated 3D object model, and generating a ray-casting-based multilayer image or a slicing-based multilayer image, based on a result of the retargeting.

A non-transitory computer readable recording medium may store a program to cause a computer to implement the above-described methods of generating 3D volumetric data.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 12 illustrates a diagram of a ray-triangle intersection method according to an embodiment;

FIG. 14 illustrates a diagram of an RGB lookup table according to an embodiment;

FIG. 17 illustrates a diagram of an object part lookup table generated based on a primitive template according to an embodiment;

DETAILED DESCRIPTION

Figure 1:
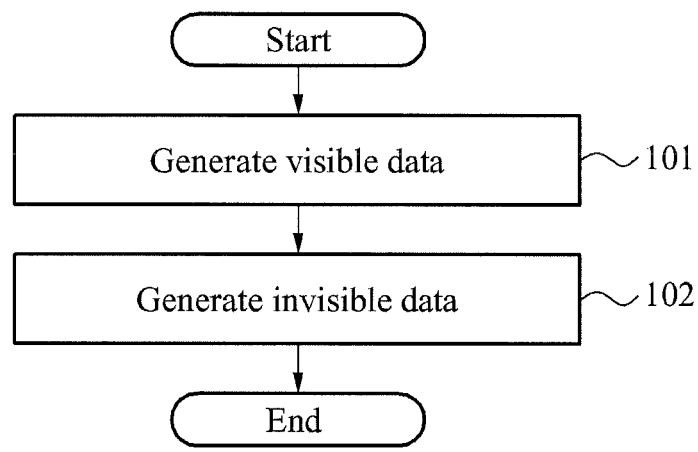
FIG. 1 illustrates a flowchart of a method of generating three-dimensional (3D) volumetric data according to an embodiment.

Reference will now be made in detail to embodiments, examples of which are illustrated in the accompanying drawings, wherein like reference numerals refer to the like elements throughout. The embodiments described below are provided to explain the present disclosure by referring to the figures.

FIG. 1 illustrates a flowchart of a method of generating three-dimensional (3D) volumetric data according to embodiments disclosed herein.

The method of FIG. 1 may be used to generate input data of learning of a recognizer for volume reconstruction of an object. In FIG. 1, visible data may be generated in operation 101, and invisible data may be generated in operation 102.

For example, volume information and a type of a visible part (namely, visible data) of the object may be generated, and volume information and a type of an invisible part (namely, invisible data) of the object may be generated.

Using the method of FIG. 1, at least one of a ray-casting-based multilayer image, a slicing-based multilayer image, a chroma key screen-based multilayer image, and a primitive template-based multilayer image may be generated, and the volume information and the type of each of the visible part and invisible part may be generated using the generated at least one multilayer image.

Figure 2:
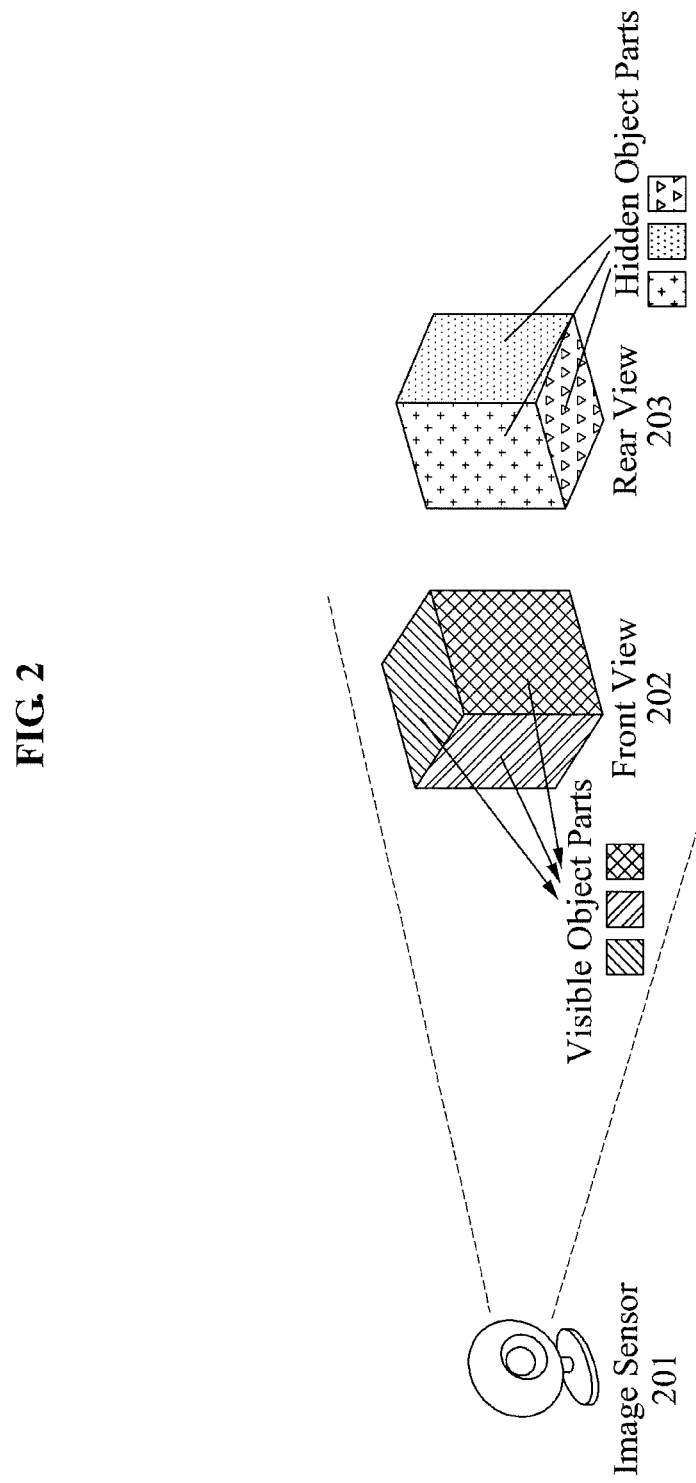
FIG. 2 illustrates a diagram of visible data and invisible data according to an embodiment.

FIG. 2 illustrates a diagram of visible data and invisible data according to example embodiments.

Referring to FIG. 2, visible parts of an object captured by an image sensor 201 may be referred to as a visible object part, and the visible data may be generated by capturing the visible object part.

Additionally, hidden parts that are hidden behind or inside the object captured by the image sensor 201 may be referred to as a hidden object part, and the invisible data may be estimated from the visible data.

When the image sensor 201 captures the object, a part of the object bearing an image formed on a sensor plane may be referred to as a visible object part, and a part of the object in which a self-occlusion of the object, or an occlusion caused by another object occurs, may be referred to as a hidden object part.

For example, three faces of a front view 202 of a regular hexahedron may be defined to be three visible object parts, and three faces of a rear view 203 of the regular hexahedron may be defined to be three hidden object parts. That is, the image sensor 201 captures visible object parts corresponding to the three sides of the cube which are visible to the image sensor 201 (e.g., the three faces are visible from the point of view of the image sensor). In contrast, the three sides of the cube which are hidden from the image sensor 201 (i.e., which are invisible to the image sensor 201) correspond to hidden object parts. Invisible data corresponding to the hidden object parts may be estimated from the visible data obtained from the visible object parts.

Figure 3:
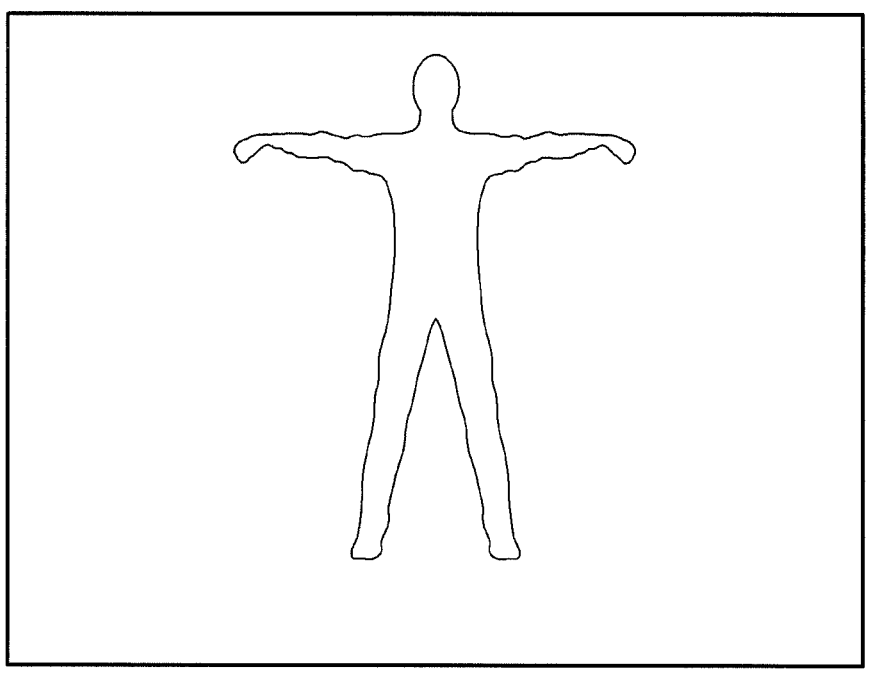
FIG. 3 illustrates a diagram of a depth image of a visible layer that is acquired by capturing a pose of an object using a depth camera according to an embodiment.

FIG. 3 illustrates a diagram of an image 300 acquired by capturing a pose of an object according to embodiments. The image 300 may be a depth image of a visible layer acquired by capturing a pose of an object using a depth camera.

Figure 4:
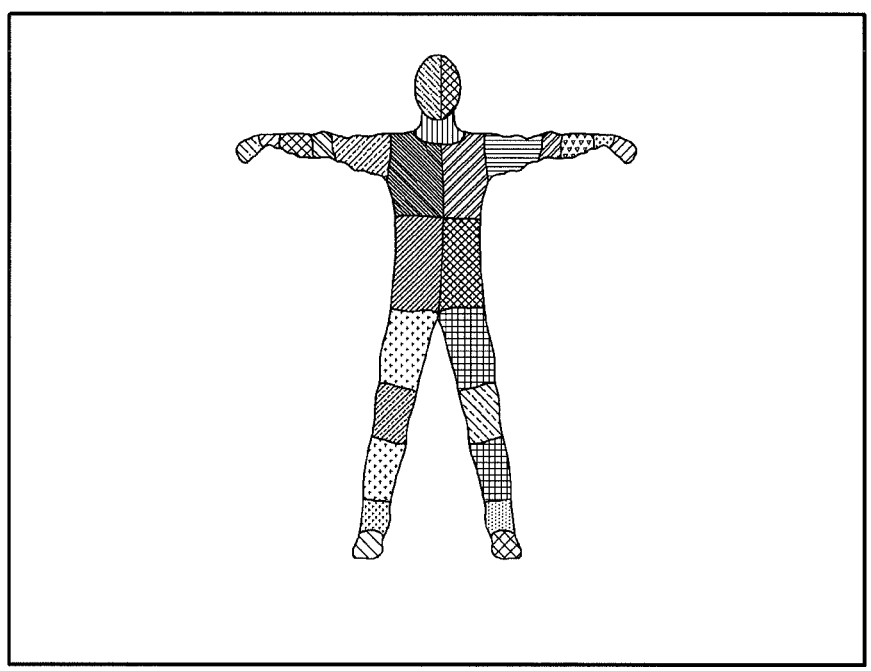
FIG. 4 illustrates a diagram of an image of object part identification information of a visible layer according to an embodiment.

FIG. 4 illustrates a diagram of an image 400 of object part identification information of a visible layer according to embodiments.

In particular, FIG. 4 illustrates an example of labeled data having object part identification information of an object that exists in depth data, namely, an image acquired by capturing a pose of the object using a depth camera. The object part identification information may be referred to as an object part ID.

The image 400 may represent the object part identification information of the visible layer. Different identification information may be assigned to parts of the object, and all the parts of the object may be distinguished from each other. For example, in FIG. 4, the different patterns which are illustrated in the drawing may correspond to different body parts having respective identification information which correspond to the body parts of the object.

Figure 5:
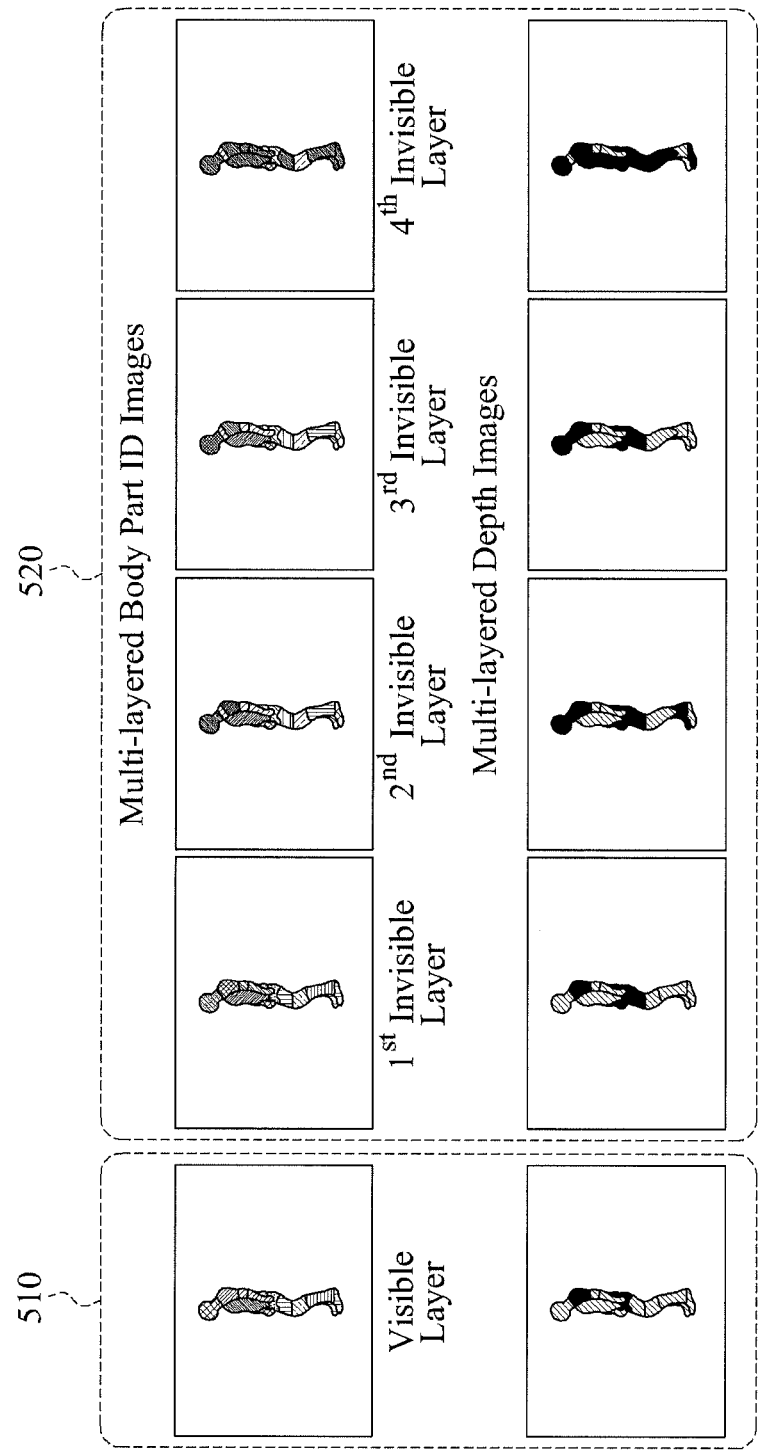
FIG. 5 illustrates a diagram of multi-layered body part ID images, and multi-layered depth images according to an embodiment.

FIG. 5 illustrates a diagram of multi-layered body part ID images, and multi-layered depth images according to embodiments.

In particular, an image 510 of FIG. 5 shows a depth image and object part identification information of a visible layer. Additionally, images 520 show depth images and object part identification information of invisible layers.

Figure 6:
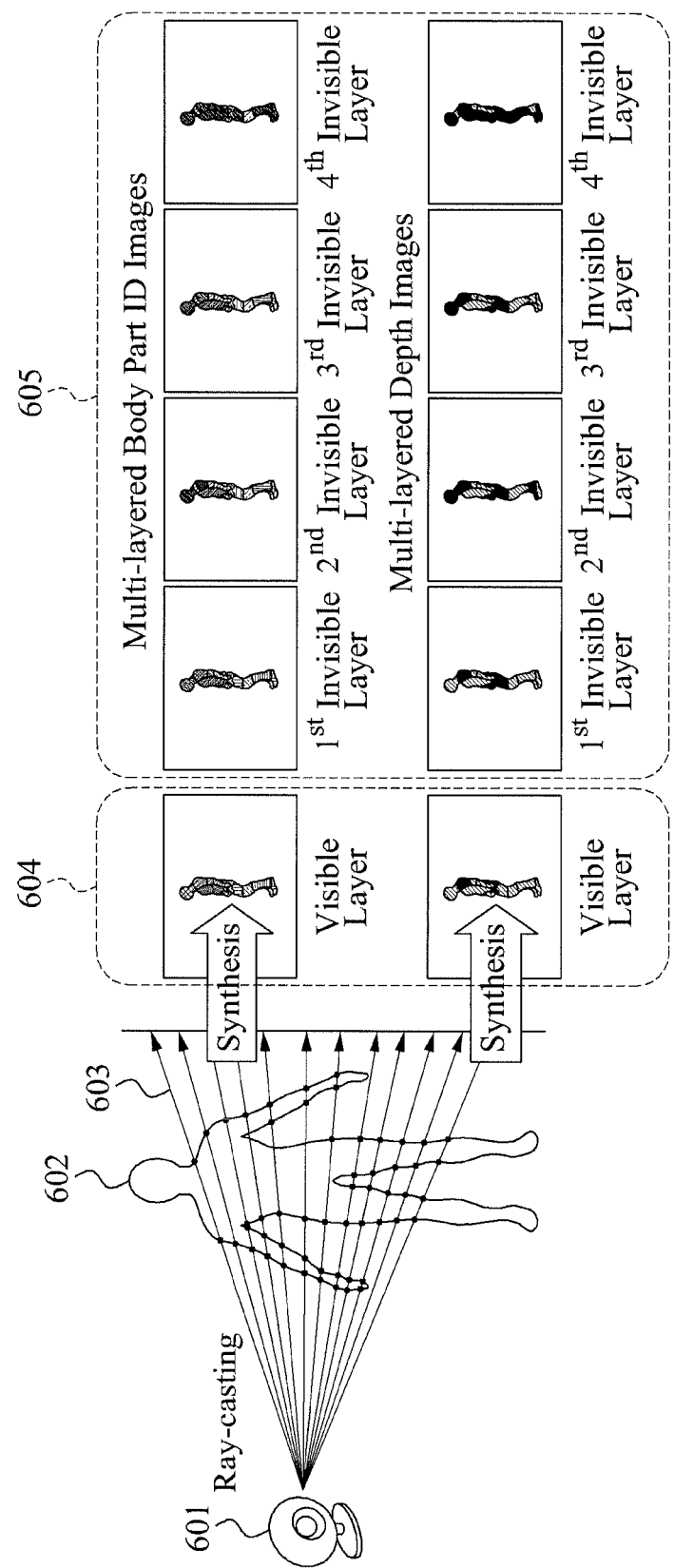
FIG. 6 illustrates a diagram of a ray-casting-based multilayer image generation method according to an embodiment.

FIG. 6 illustrates a diagram of a ray-casting-based multilayer image generation method according to embodiments.

In particular, FIG. 6 illustrates a concept of the ray-casting-based multilayer image generation method.

The ray-casting-based multilayer image generation method may refer to a method of generating virtual rays 603 in a direction of (toward) a 3D object 602 from a location of a camera 601, and of storing, in an image, pixels of a surface of the 3D object 602 in contact with the virtual rays 603 every time the virtual rays 603 penetrate through the surface.

In this instance, a surface that is initially in contact with the virtual rays 603 may be stored as a visible layer 604, and a surface of a rear side that is in contact with the virtual rays 603 penetrating through the 3D object 602 may be stored as an invisible layer 605. Accordingly, by using the ray-casting-based multilayer image generation method, both a visible object part and an invisible object part may be generated.

Figure 7:
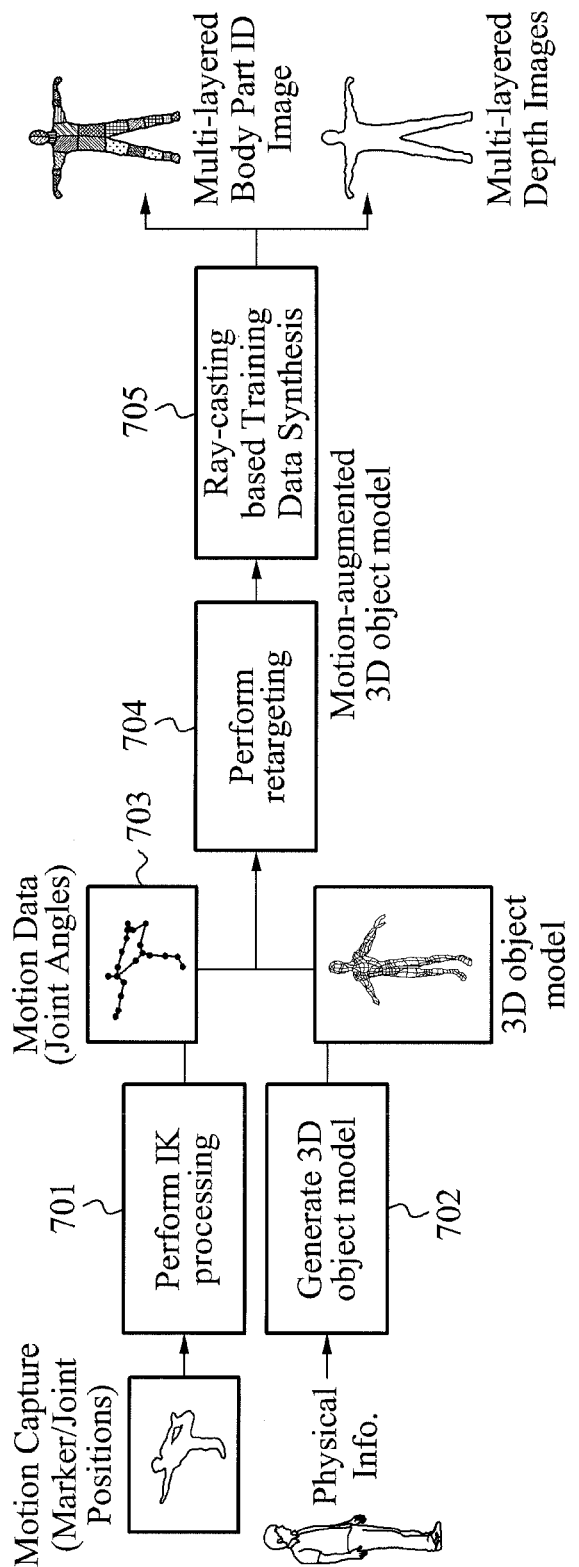
FIG. 7 illustrates a diagram of a ray-casting-based multilayer image generation method as an example of generating a multilayer image according to an embodiment.

FIG. 7 illustrates a diagram of a ray-casting-based multilayer image generation method as an example of generating a multilayer image according to embodiments.

To generate a ray-casting-based multilayer, inverse kinematics (IK) processing may be performed on data acquired by capturing a motion of an object in operation 701, and motion data may be generated in operation 703.

Additionally, a 3D object model may be generated in operation 702, independently from the IK processing. The 3D object model may include a combination of 3D meshes based on a real body type of the object.

Subsequently, the generated motion data and the generated 3D object model may be merged, and a motion-augmented 3D object model may be generated.

In this instance, to match the motion data to a 3D object model with another body type, retargeting may be performed on the generated 3D object model in operation 704.

In operation 705, data may be synthesized based on ray casting, to generate a ray-casting-based multilayer image.

Figure 8:
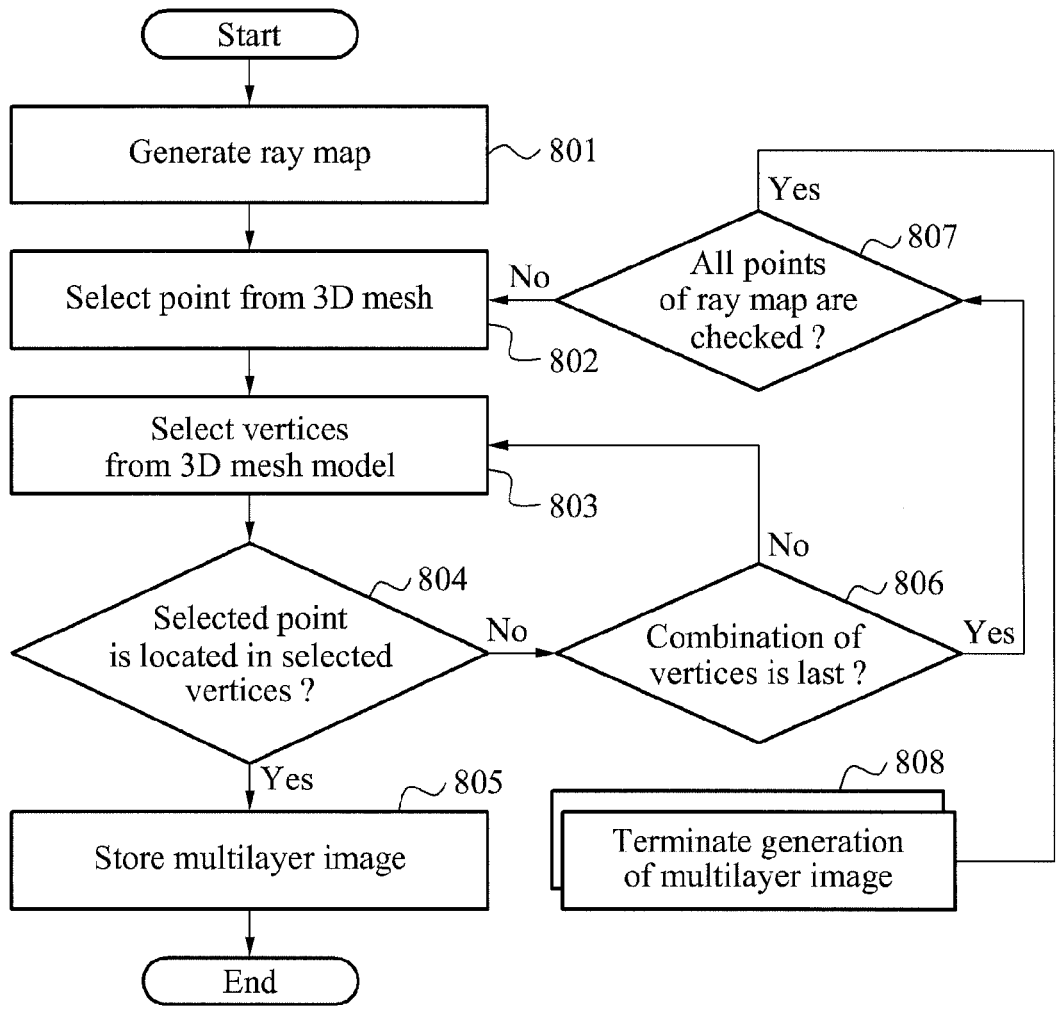
FIG. 8 illustrates a flowchart of the ray-casting-based multilayer image generation method of FIG. 7.

FIG. 8 illustrates a flowchart of the ray-casting-based multilayer image generation method of FIG. 7.

In the ray-casting-based multilayer image generation method, namely, a ray-casting-based training data synthesis method, a ray map based on ray casting may be generated in operation 801.

In operation 802, a single point may be selected from a 3D mesh of the generated ray map. In operation 803, a plurality of vertices, for example three vertices, may be selected from the generated 3D object model, namely, a 3D mesh model. That is, the 3D object may be represented using a 3D object model which may be generated using various geometric patterns to generate the 3D mesh model (for example, nets of interconnected geometric shapes such as triangles, squares, cones, etc.).

In operation 804, whether the point of the ray map is located in the plurality of vertices, for example three vertices, may be determined.

In other words, a relative location between the selected point and the plurality of vertices may be verified.

In the ray-casting-based multilayer image generation method, a single ray may be selected, and a single mesh may be selected from among a plurality of meshes forming a 3D object model, for example a plurality of meshes formed in a form of a polygon. Additionally, whether a plurality of vertices forming the selected mesh intersects with the selected ray may be determined, and whether a single point of the selected ray is located in a polygon (e.g., a triangle) formed with a plurality of vertices, (for example three vertices), may be determined.

When the selected point is determined to be located in the plurality of vertices, that is, when the selected point and the plurality of vertices are determined to intersect, the multilayer image may be stored in operation 805.

When the selected point is determined not to be located in the plurality of vertices, whether a combination of the plurality of vertices is a last combination of vertices may be determined in operation 806. When the combination of the plurality of vertices is determined to be the last combination, whether all points of the ray map are checked may be determined in operation 807. When all of the points are determined to be checked in operation 807, generation of the multilayer image may be terminated in operation 808.

When the combination of the plurality of vertices is determined not to be the last combination of the vertices in operation 806, the ray-casting-based multilayer image generation method may revert to operation 803, and a new plurality of vertices may be selected from the 3D mesh model.

When all of the points are determined not to be checked in operation 807, the ray-casting-based multilayer image generation method may revert to operation 802, and a new point may be selected from the 3D mesh of the generated ray map.

To determine whether the selected point and the plurality of vertices intersect, a ray-triangle intersection method may be used. The ray-triangle intersection method will be further described with reference to FIG. 12.

Figure 9:
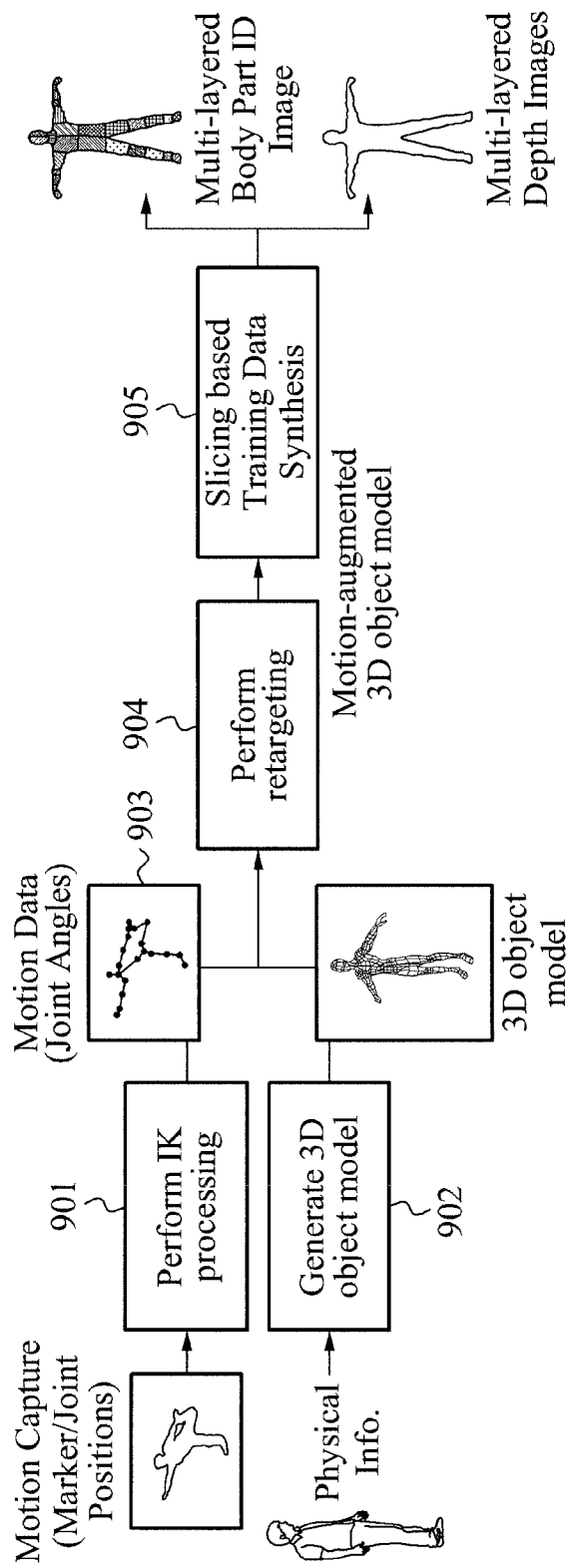
FIG. 9 illustrates a diagram of a slicing-based multilayer image generation method that is obtained by modifying the ray-casting-based multilayer image generation method of FIG. 7.

FIG. 9 illustrates a diagram of a slicing-based multilayer image generation method that is obtained by modifying the ray-casting-based multilayer image generation method of FIG. 7.

In the slicing-based multilayer image generation method, IK processing may be performed on data acquired by capturing a motion of an object in operation 901, and motion data may be generated in operation 903.

Additionally, a 3D object model may be generated in operation 902, independently from the IK processing. The 3D object model may include a combination of 3D meshes based on a real body type of the object.

Subsequently, the generated motion data and the generated 3D object model may be merged, and a motion-augmented 3D object model may be generated.

In this instance, to match the motion data to a 3D object model with another body type, retargeting may be performed on the generated 3D object model in operation 904.

In operation 905, data may be synthesized based on slicing, to generate a slicing-based multilayer image. The slicing-based multilayer image generation method will be further described with reference to FIG. 10.

Figure 10:
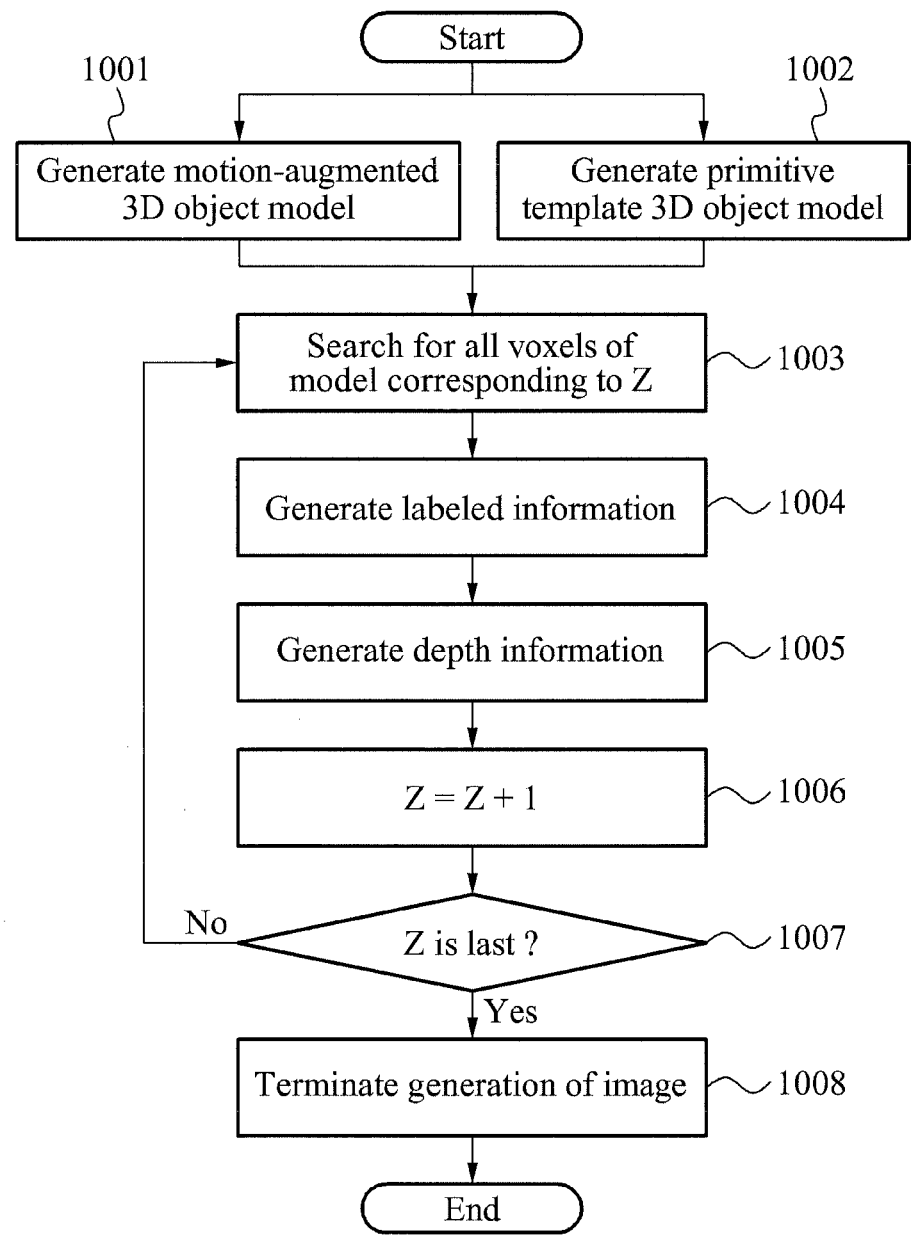
FIG. 10 illustrates a flowchart of the slicing-based multilayer image generation method of FIG. 9.

FIG. 10 illustrates a flowchart of the slicing-based multilayer image generation method of FIG. 9.

Referring to FIG. 10, in the slicing-based multilayer image generation method, a motion-augmented 3D object model may be generated in operation 1001, or a primitive template 3D object model may be generated in operation 1002.

In operation 1003, all pixels (or voxels) of a model corresponding to a current depth value Z may be searched for, using the generated motion-augmented 3D object model or the generated primitive template 3D object model.

When a pixel corresponding to the current depth value Z is found, labeled information may be generated in operation 1004, and depth information may be generated together with the labeled information in operation 1005.

Subsequently, the current depth value Z may be incremented by '1' in operation 1006, and whether the current depth value Z is a last depth value may be determined in operation 1007. Operations 1003 through 1006 may be performed repeatedly until the current depth value Z is determined to be the last depth value, and generation of an image may be terminated in operation 1008.

Figure 11:
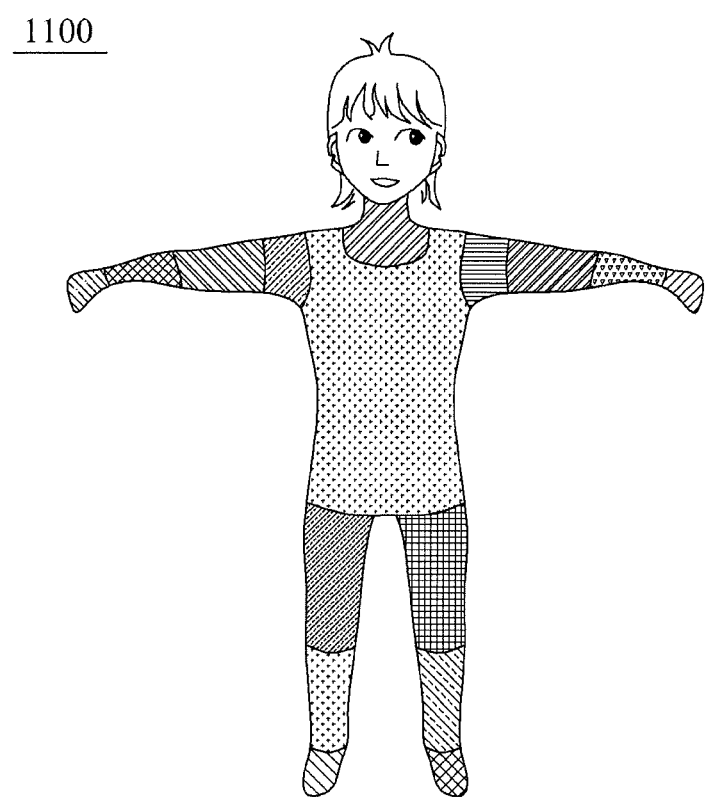
FIG. 11 illustrates a diagram of an example in which an object wears a color patch suit according to an embodiment.

FIG. 11 illustrates a diagram of an example 1100 in which an object wears a color patch suit according to embodiments.

In a chroma key screen-based multilayer image generation method, a color camera image may be generated from a chroma key screen and the color patch suit of the object. Different colors may be applied to the color patch suit for each object part. A number of color patches of the color patch suit may be changed based on an object part.

As described above, the ray-triangle intersection method may be used to determine whether the selected point and the plurality of vertices intersect.

Referring to reference numeral 1210 of FIG. 12, three vertices $P_0$, $P_1$ and $P_2$, are shown, and a normal vector 'n' may be defined, as given in Equation 1.

n: normal of the plane $$n=(P_1-P_0)\times(P_2-P_0) \qquad \text{[Equation 1]}$$

n denotes a normal vector of a plane including vertices $P_0$, $P_1$, and $P_2$.

Here, the normal vector 'n' may be interpreted to be vertical to vector $P_2-P_0$ and also to be vertical to $P_1-P_2$ in 3D space.

Referring to reference numerals 1220 and 1230 of FIG. 12, whether a ray vector 'x' intersects with a plane including three vertices $P_0$, $P_1$ and $P_2$ may be determined according to Equation 2 shown below. In this instance, a normal vector 'n' of the plane may also be used, as given in Equation 2.

$$(P_1-P_0)\times(x-P_0)\cdot n \geq 0$$

$$(P_2-P_1)\times(x-P_1)\cdot n \geq 0$$

$$(P_0-P_2)\times(x-P_2)\cdot n \geq 0 \qquad \text{[Equation 2]}$$

Here, reference numeral 1220 is an embodiment in which the ray vector 'x' is located within vertices, and reference numeral 1230 is an embodiment in which the ray vector 'x' is located outside the vertices. For example, reference numerals 1220 and 1230 are embodiments for determining whether the ray vector 'x' is located within or outside the vertices.

CCW denotes a direction. Here, $CCW_0$, $CCW_1$, and $CCW_2$ denote directions toward the ray vector 'x' within the vertices, for example, counterclockwise direction. Further, $CCW_3$ and $CCW_5$ denote directions toward the ray vector 'x' located outside the vertices, for example, counterclockwise direction. $CCW_4$ denotes clockwise direction.

Figure 13:
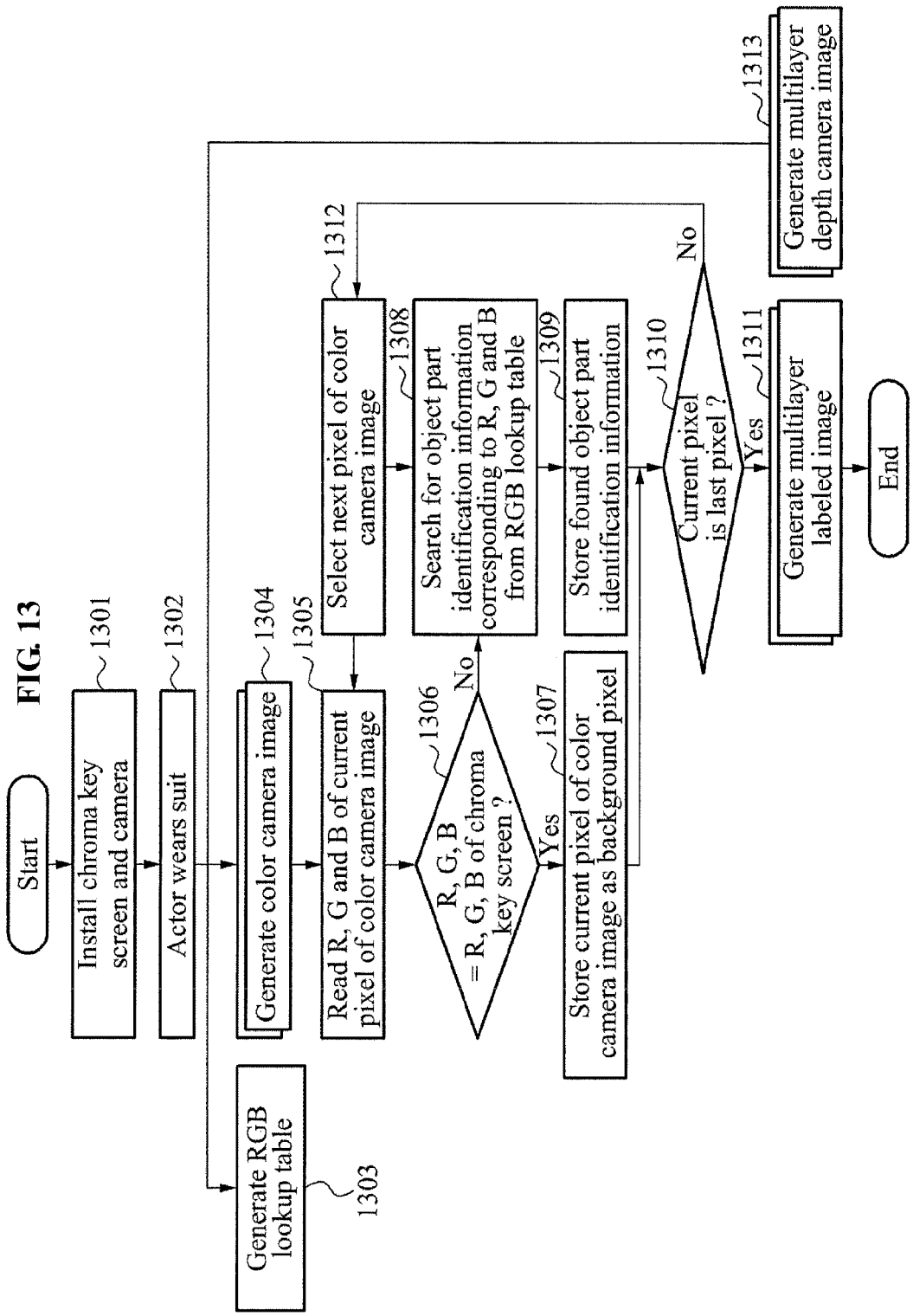
FIG. 13 illustrates a flowchart of a chroma key screen-based multilayer image generation method as another example of generating a multilayer image according to an embodiment.

FIG. 13 illustrates a flowchart of a chroma key screen-based multilayer image generation method as another example of generating a multilayer image according to embodiments. A chroma key screen may refer to a screen or background which is generally comprised of a single color (e.g., blue or green), which may be highly saturated.

For the chroma key screen-based multilayer image generation method, a chroma key screen and a camera may be installed in operation 1301, and an actor may wear a suit to which different colors are applied for each object part in operation 1302. Generally, the suit may be comprised of colors different from the chroma key screen, but it is not required.

Subsequently, an RGB (red, green, blue) lookup table may be generated in operation 1303, and a color camera image may be generated in operation 1304. In the RGB lookup table, color patch information of the suit and object part identification information may be recorded.

The RGB lookup table will be further described with reference to FIG. 14.

As shown in FIG. 14, an RGB lookup table 1400 shows an example in which two chroma key screens are installed.

In the chroma key screen-based multilayer image generation method, the RGB lookup table 1400 associated with object part identification information may store color information (for example, red, green, blue) of a color patch pixel (x, y), and may store a corresponding object part ID (namely, a color patch). For example, in FIG. 14, object part ID may correspond to a lime-green color patch which may be worn on the a body part of the user, e.g., an arm portion. The RGB values may correspond to the lime-green color patch and each color may have a range of values. For example, in FIG. 14, red ranges from 150-162, while green ranges from 244-255, and blue ranges from 51-75.

An input of the RGB lookup table 1400 may correspond to color information (for example, R, G and B) of a predetermined pixel of a color camera, and an output of the RGB lookup table 1400 may correspond to object part identification information. Color spaces or color models having color information other than RGB may be utilized. For example, CMYK, RGBY, HSV, may be used in the form of a lookup table instead of, or in addition to, RGB.

Referring back to FIG. 13, the color camera image may be generated from the chroma key screen and the suit.

Subsequently, color information of a current pixel of the generated color camera image may be verified, the verified color information may be compared with the RGB lookup table, and object part identification information corresponding to the color information may be searched for.

Specifically, color information, namely R, G and B values, of the current pixel of the color camera image may be read in operation 1305, and whether the read R, G and B values are identical to those of the chroma key screen may be determined in operation 1306.

When the read R, G and B values are determined to be identical to those of the chroma key screen, the current pixel of the color camera image may be stored as a "background pixel" in operation 1307.

In operation 1310, whether the current pixel is a last pixel of the color camera image may be determined. When the current pixel is determined to be the last pixel, a multiplayer labeled image may be generated in operation 1311.

When the read R, G and B values are determined to be different from those of the chroma key screen, object part identification information corresponding to the R, G and B values may be searched for based on the RGB lookup table in operation 1308, and the found object part identification information may be stored in operation 1309. By way of example, a read RGB value of a current pixel is 52, 75, and 105, and the chroma key screen has an RGB value of 0, 255, and 0 (corresponding to a green background screen). It may be determined from the read RGB value that the current pixel has an RGB value different from the chroma key screen, and based upon a search of the lookup table, corresponds to object part 1.

When the current pixel is determined not to be the last pixel in operation 1310, a next pixel of the color camera image may be selected in operation 1312, and operation 1305 may be performed and the process repeated.

Figure 15:
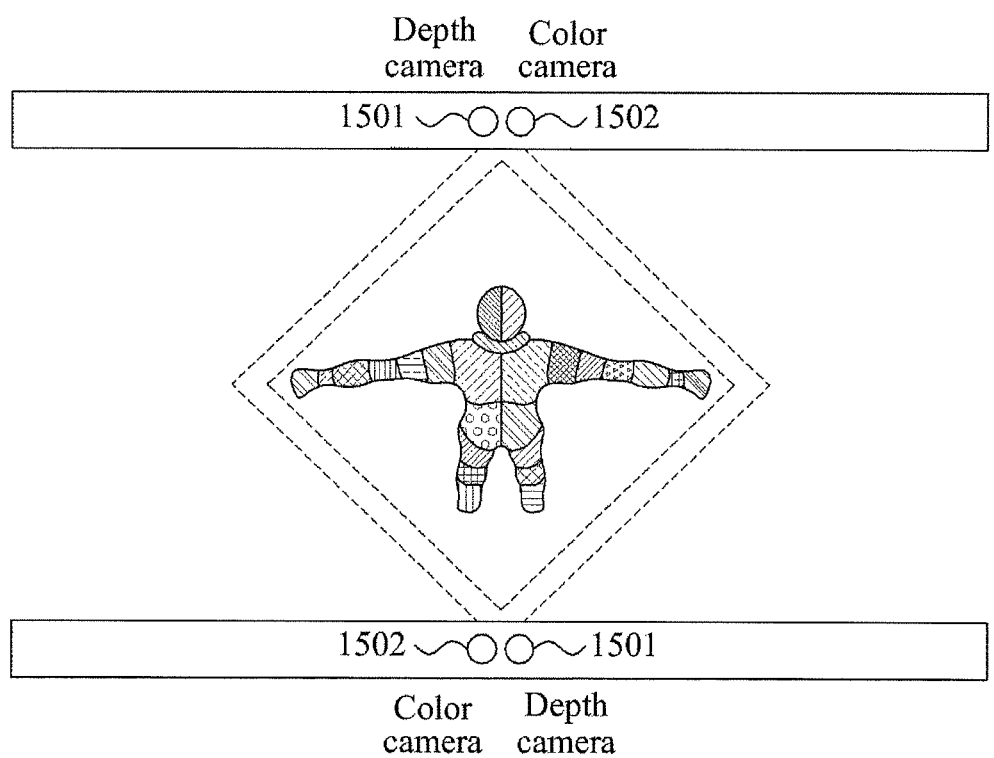
FIG. 15 illustrates a diagram of an example in which two chroma key screens are installed, according to an embodiment.

Referring to FIG. 15, a multilayer image generation environment may be configured by installing a plurality of chroma key screens, a plurality of depth cameras, and a plurality of color cameras. In the multilayer image generation environment of FIG. 15, a multilayer image may be generated using the chroma key screen-based multilayer image generation method of FIG. 13.

In FIG. 15, two depth cameras 1501, and two color cameras 1502 may be individually installed. However, a plurality of chroma key screens, a plurality of depth cameras, and a plurality of color cameras may be installed. That is, two or more chroma key screens, depth cameras, and color cameras may be used.

Specifically, the RGB lookup table of FIG. 13 may be generated from color patch information of the suit that the actor wears, based on a color image captured by a color camera.

For example, when an actor wearing a color patch suit enters the multilayer image generation environment of FIG. 15, R, G and B values of a current pixel of a color image may be read. In this instance, whether the pixel has the same color information as the chroma key screen may be determined. When the pixel is determined to have the same color information as the chroma key screen, a current pixel of a labeled image may be stored as a "background pixel." When the pixel is determined to have different color information from the chroma key screen, object part identification information corresponding to the read R, G and B values may be searched for from a lookup table. The object part identification information may be stored in the current pixel of the labeled image.

A number of color patches in a suit of an object may not be limited.

Additionally, whether the current pixel is a last pixel of an input image may be determined. When the current pixel is determined to be the last pixel, generation of the labeled image may be terminated. When the current pixel is determined not to be the last pixel, a next pixel may be selected, and the labeled image may be continuously generated. In this instance, a retro-reflective marker and the like may be additionally attached onto the color patch suit, and detailed motion data may be generated.

Figure 16:
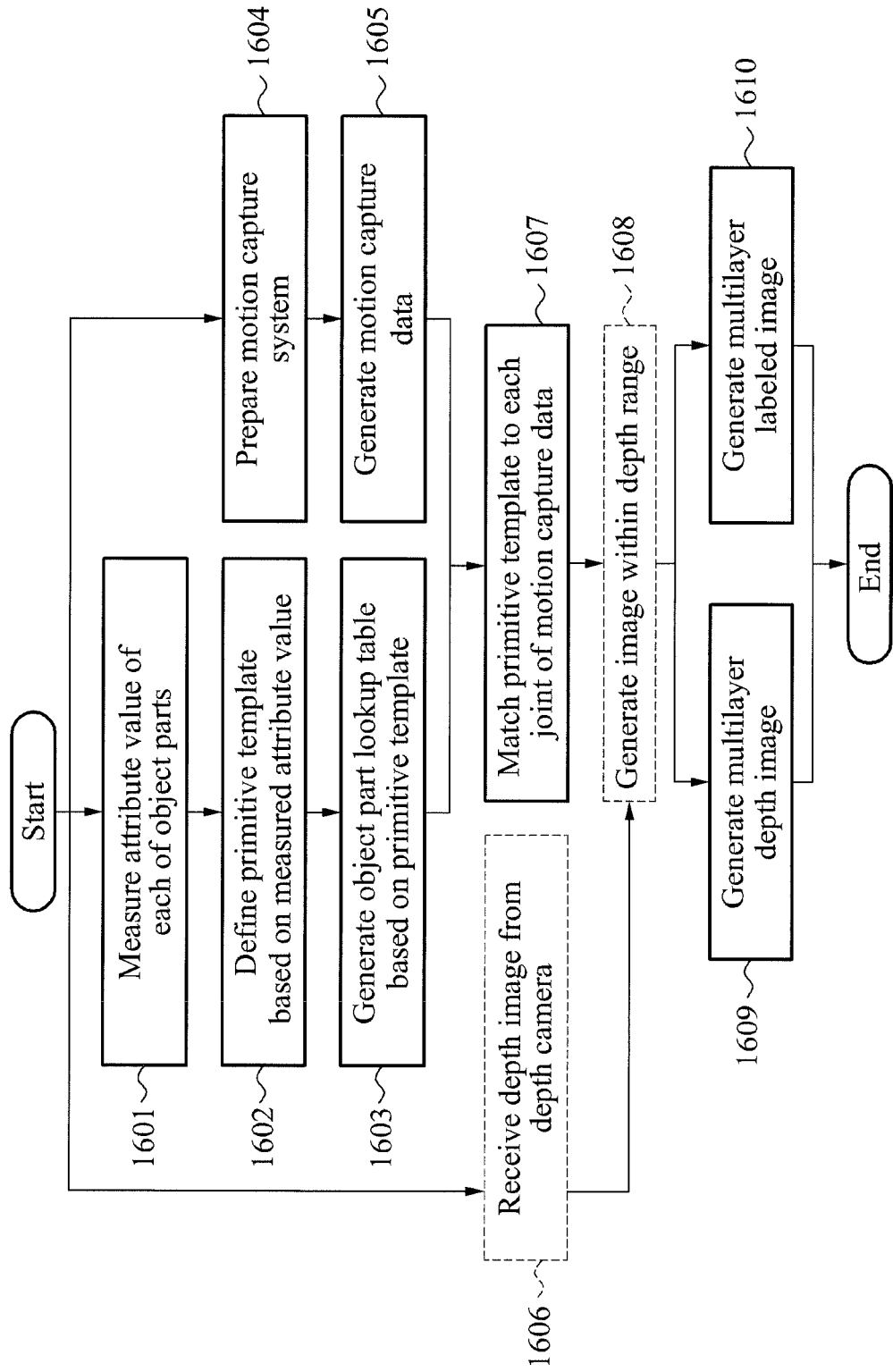
FIG. 16 illustrates a flowchart of a primitive template-based multilayer image generation method as still another example of generating a multilayer image according to an embodiment.

FIG. 16 illustrates a flowchart of a primitive template-based multilayer image generation method as still another example of generating a multilayer image according to embodiments.

Referring to FIG. 16, in operation 1601, an attribute value of each of object parts based on gender, age, and body type may be measured.

Subsequently, a primitive template may be defined based on the measured attribute value in operation 1602, and an object part lookup table may be generated based on the defined primitive template in operation 1603.

For example, an object part lookup table may be generated based on a primitive template, using an average value of the gender, the age, and the body type (e.g., height, weight, body shape) as an attribute. Other parameters or characteristics may be used as an attribute (e.g., skin complexion, hair characteristics, etc.).

In operation 1604, a motion capture system may be prepared while the object part lookup table is generated. In operation 1605, motion capture data may be generated using the prepared motion capture system.

For example, motion capture data may be generated using a plurality of IR cameras, a retro-reflective marker, and the like. In this instance, there is no limitation to a type of a system used to generate motion capture data.

In operation 1606, a depth image may be received from a depth camera, in parallel with generation of the object part lookup table and generation of the motion capture data. That is, the depth image, object part lookup table, and motion capture data may be obtained simultaneously or substantially simultaneously with one another.

In operation 1607, the defined primitive template may be matched to each joint of the generated motion capture data, based on the generated object part lookup table.

In operation 1608, an image may be generated within a selected depth range based on the received depth image. The selected depth range may be a predetermined depth value z.

In an example, the depth image may be generated from depth information recorded in the object part lookup table.

In another example, when depth data and motion data are acquired using both the depth camera and a motion data generation system, the depth image may be generated more accurately based on a depth image range, and a size and volume of a region matched using the primitive template.

Subsequently, a multilayer depth image may be generated from the generated image in operation 1609, and a multilayer labeled image may be generated from the generated image in operation 1610.

FIG. 17 illustrates a diagram of an object part lookup table 1700 generated based on a primitive template according to embodiments.

The object part lookup table 1700 may store attribute values measured for each of object parts based on gender, age, and body type. In this instance, an average and standard deviation of the attribute values may be calculated and stored.

Figure 18:
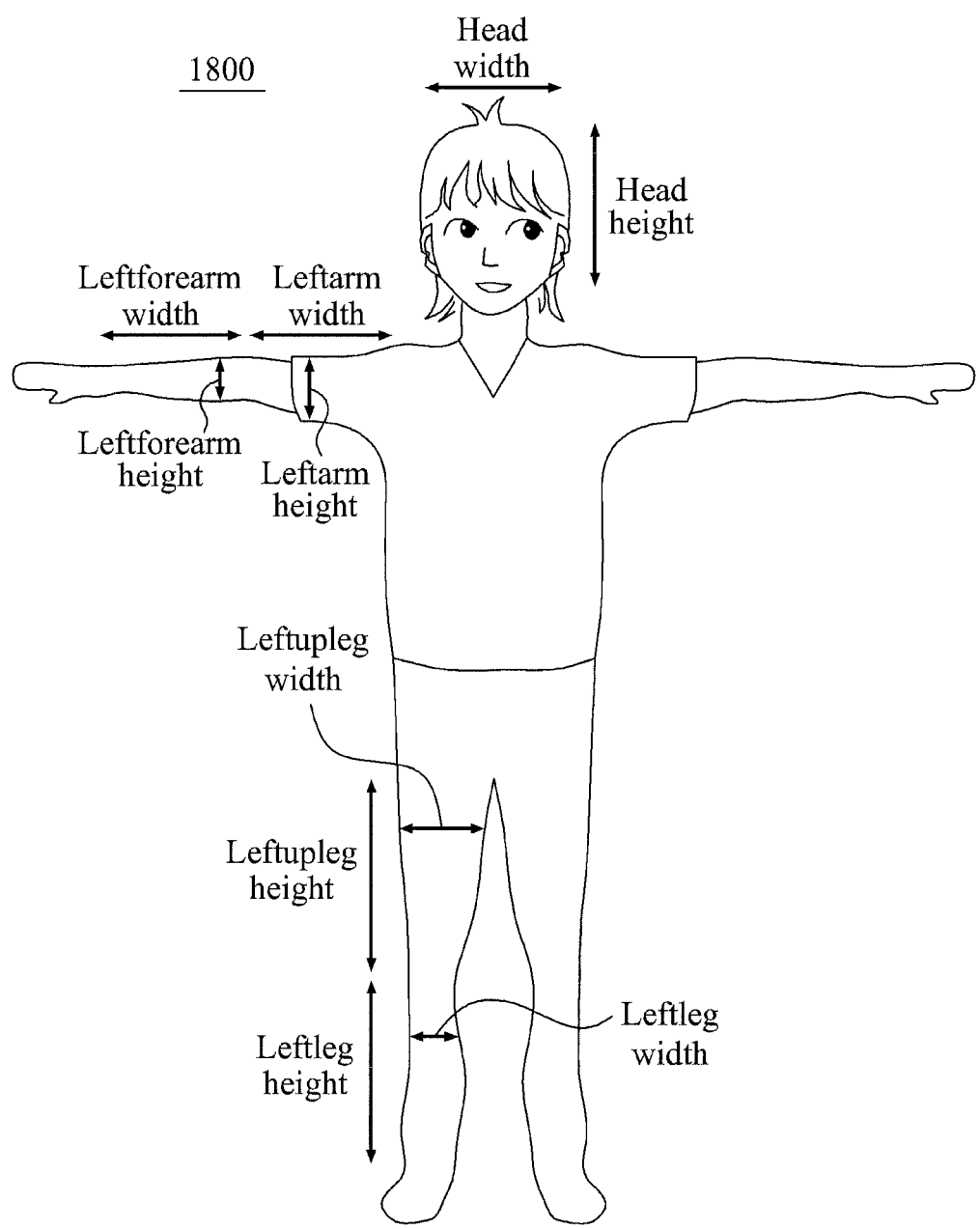
FIG. 18 illustrates a diagram of an example of actually measuring each object part property of an object according to an embodiment.

FIG. 18 illustrates a diagram of an example of actually measuring each object part property of a human 1800 according to embodiments.

As shown in FIG. 18, each object part property may be computed by measuring an attribute value of each object part based on gender, age, and body type, and by obtaining an average and standard deviation. The object part lookup table 1700 may be generated based on the measured information.

Figure 19:
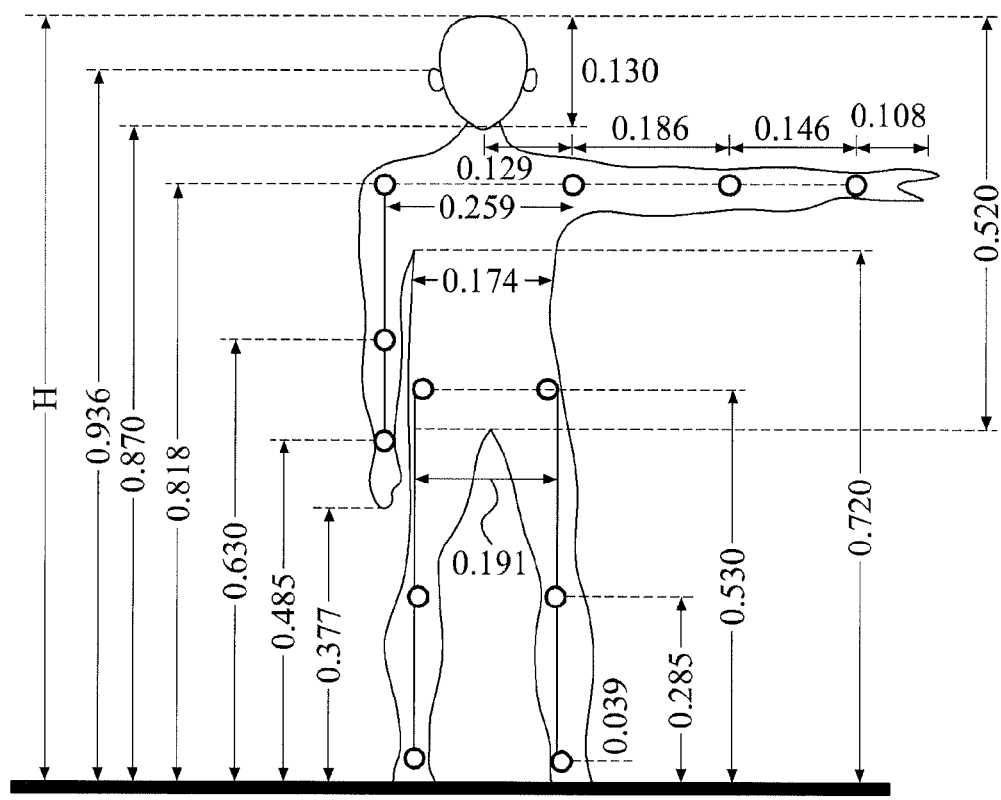
FIG. 19 illustrates a diagram of an example of determining each object part property of an object according to an embodiment.

FIG. 19 illustrates a diagram of an example of determining each object part property of a human 1900 according to embodiments. As shown in FIG. 19, attribute values measured for each object part may be determined based on an object ratio. For example, as shown in FIG. 19, the object ratio for a height of a waist area may be about 0.530, the object ratio for a height of knee area may be about 0.285, and an object ratio for a width of a waist area may be about 0.191.

Figure 20:
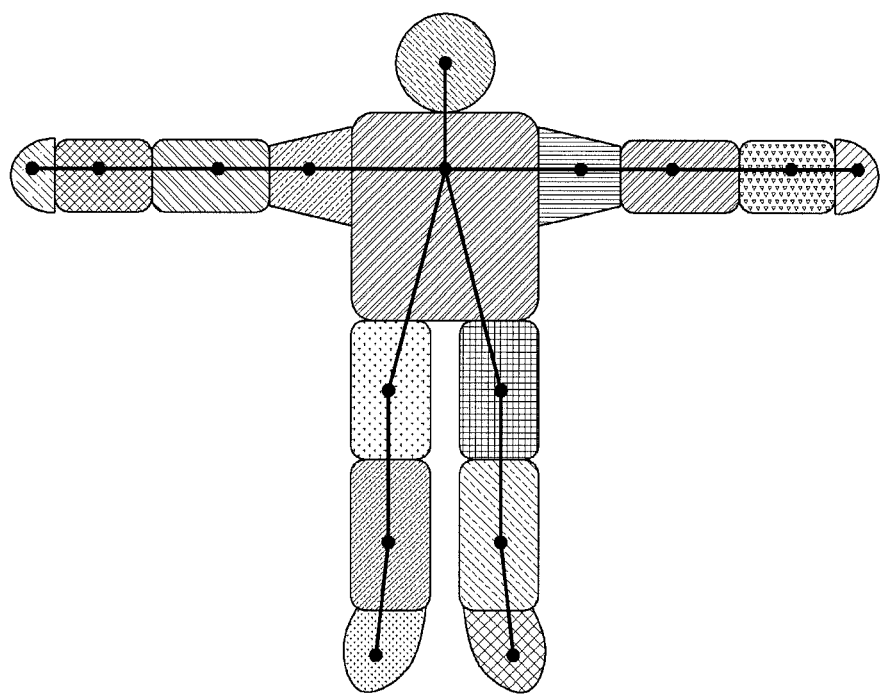
FIG. 20 illustrates a diagram of an example in which a primitive template of a two-dimensional (2D) object part is matched on motion capture data according to an embodiment.

FIG. 20 illustrates a diagram of an example 2000 in which a primitive template of a two-dimensional (2D) object part is matched on motion capture data according to embodiments.

As shown in FIG. 20, different figures may be set to object parts. For example, a circle and trapezoids may be set to a head and shoulders, respectively. Additionally, rectangles may be set to arms, a trunk, and legs, and semicircles and arcs may be respectively set to hands and feet. A type of figures may not be limited to the above types, and may include other polygonal or geometric shapes.

Figure 21:
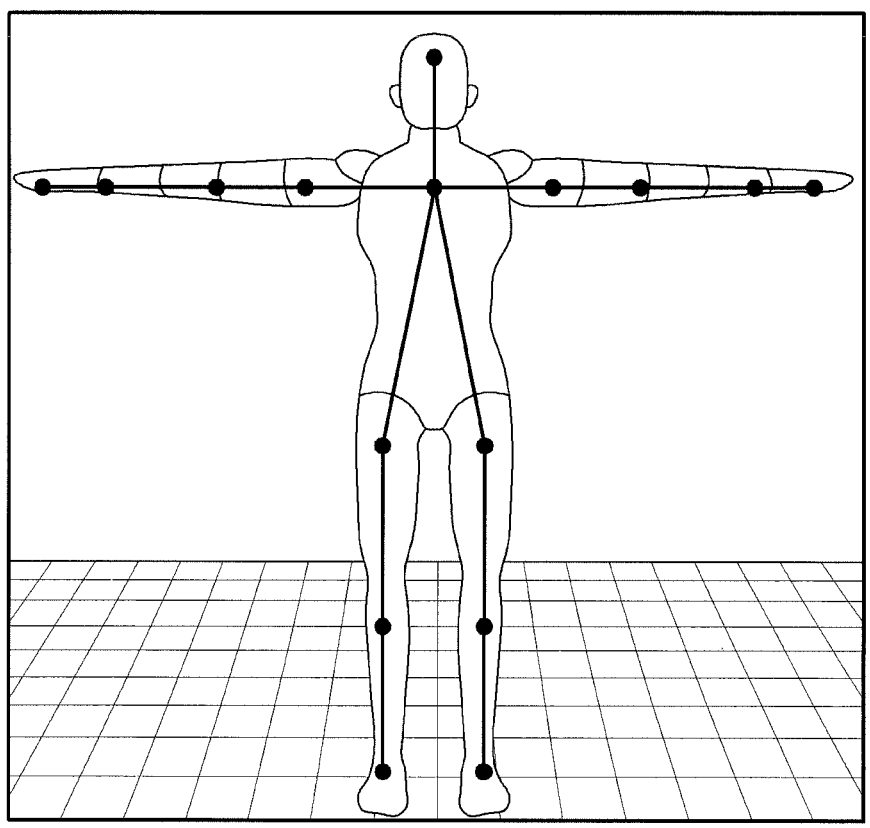
FIG. 21 illustrates a diagram of an example in which a primitive template of a 3D object part is matched on motion capture data according to an embodiment.

FIG. 21 illustrates a diagram of an example 2100 in which a primitive template of a 3D object part is matched on motion capture data according to embodiments. Each object part may be formed in a 3D object shape, and a primitive template may be defined.

Figure 22:
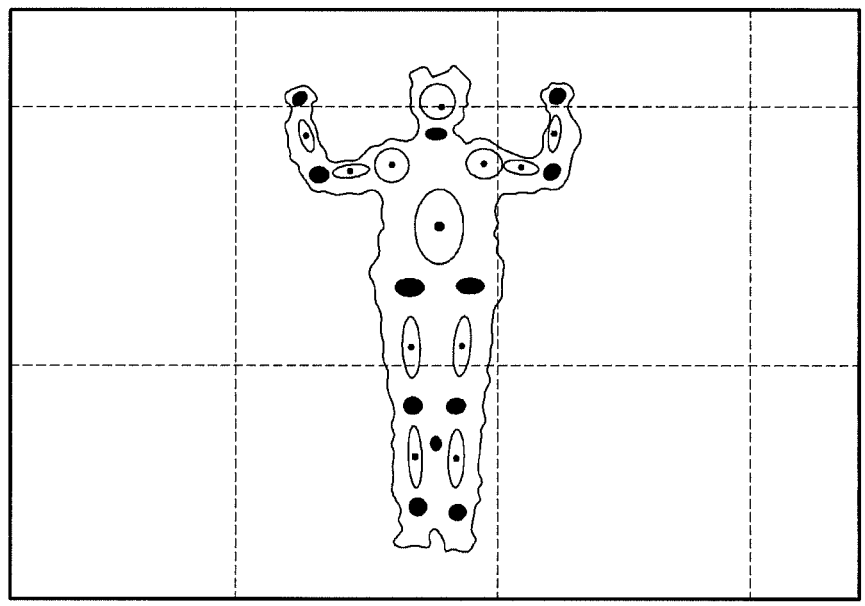
FIG. 22 illustrates a diagram of an example in which an image is generated within a depth range in response to an input of a depth camera in FIG. 17.

FIG. 22 illustrates a diagram of an example in which an image is generated within a depth range in response to an input of a depth camera in FIG. 17. A labeled image 2200 may be generated using a primitive object part template within a range of real depth data.

Figure 23:
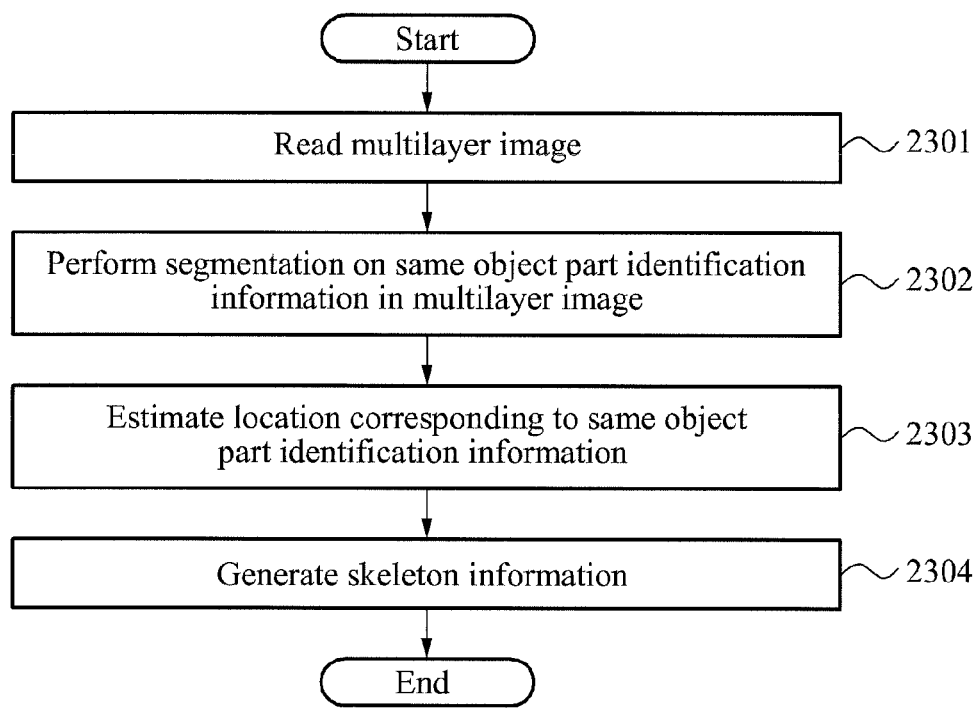
FIG. 23 illustrates a flowchart of a method of generating skeleton data in a multilayer image according to an embodiment.

FIG. 23 illustrates a flowchart of a method of generating skeleton data in a multilayer image according to embodiments.

Referring to FIG. 23, a multilayer image may be read in operation 2301, and segmentation may be performed on the same object part identification information from the read multilayer image in operation 2302. That is, the multilayer image may include information on a plurality of object parts, and using the information an object part may be identified. Thus, for data which includes information (e.g., RGB values for a current pixel, depth values, attribute values, etc.) that corresponds to an object part (e.g., an arm, leg, head, etc.), segmentation may be performed to segment the object according to the object part the information corresponds to.

Subsequently, a location corresponding to the same object part identification information may be estimated in operation 2303, and skeleton information may be generated using the estimated location in operation 2304.

Figure 24:
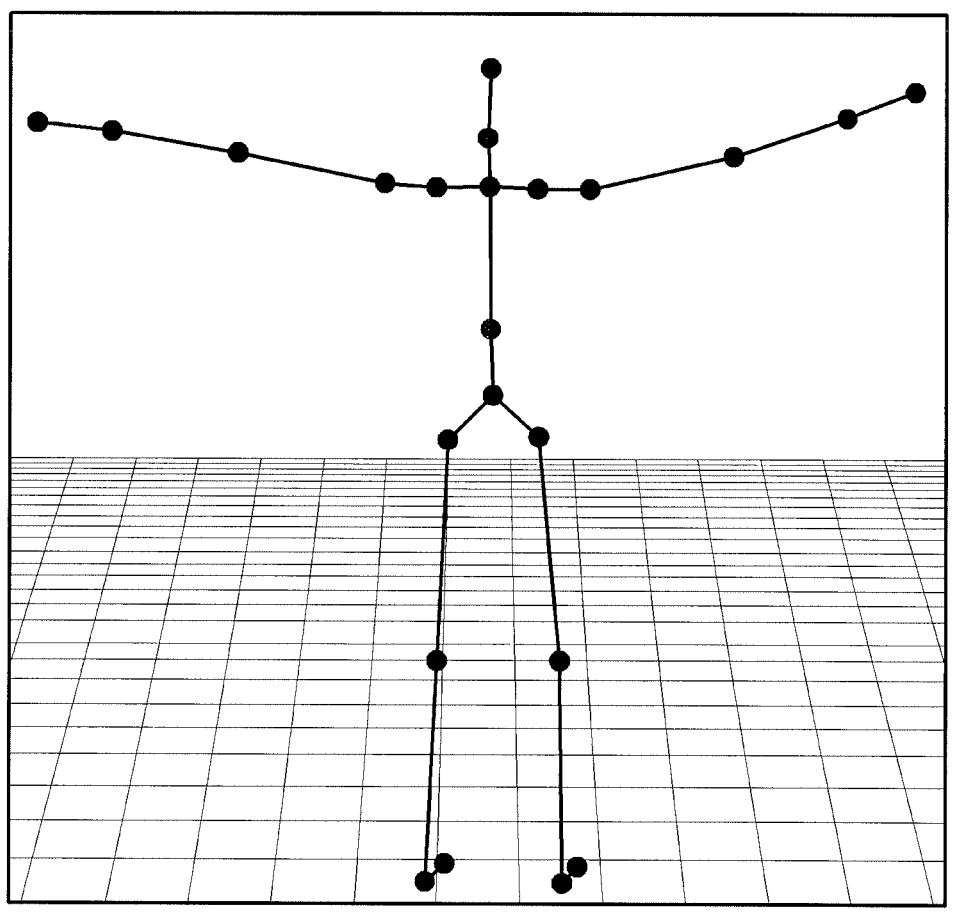
FIG. 24 illustrates a diagram of a skeleton model estimated based on a multilayer image according to an embodiment.

FIG. 24 illustrates a diagram of a skeleton model 2400 estimated based on a multilayer image according to embodiments.

A method of generating a skeleton model based on FIGS. 21 and 23 may be used by a motion data capture system without a separate retro-reflective marker.

As described above, according to embodiments, a generated product may be utilized as input data of learning of a recognizer for volume reconstruction of an object, and may be utilized as data enabling recognition of a volume and pose of the object. Additionally, 3D volumetric data of an object including a visible layer and an invisible layer may be generated. The above-described embodiments may applicable to computer graphics, computer simulation, and the like, and may be used for video gaming, video production, medical imaging, and the like. However, the above-mentioned examples are merely examples, and are not intended to be limiting.

The method of generating 3D volumetric data according to the above-described example embodiments may be implemented using one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but is not limited to, a software or hardware component, circuit, or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The method of generating 3D volumetric data according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Although example embodiments have been shown and described, it would be appreciated by those skilled in the art that changes may be made to these embodiments without departing from the principles and spirit of the disclosure, the scope of which is defined in the claims and their equivalents.

What is claimed is:

1. A method of generating three-dimensional (3D) volumetric data, the method comprising:
   generating, using a processor, a multilayer image;
   generating volume information and a type of a visible part of an object, based on the generated multilayer image;
   generating volume information and a type of an invisible part of the object, based on the generated multilayer image;
   generating motion data, by capturing a motion of the object;
   generating a 3D object model, the 3D object model including a combination of 3D meshes, based on a real body type of the object;
   performing retargeting, to match the generated motion data to the generated 3D object model; and
   generating, based on a result of the retargeting, a slicing-based multilayer image;
   wherein the generating of the slicing-based multilayer image based on the result of the retargeting comprises:
      generating a primitive template 3D object model or a motion-augmented 3D object model, based on the motion data and the 3D object model;
      generating labeled information and depth information, when a pixel corresponding to a current depth value exists in the generated motion-augmented 3D object model or the generated primitive template 3D object model, wherein the labeled information has object part identification information of a part of the object; and
      generating the multilayer image, using the generated labeled information and the generated depth information.

2. The method of claim 1, wherein the generating of the multilayer image comprises:
   generating a ray-casting-based multilayer image, based on a result of the retargeting.

3. The method of claim 2, wherein the generating of the ray-casting-based multilayer image comprises:
   generating a ray map, based on ray casting;
   selecting a point from the generated ray map, and selecting a plurality of vertices from the generated 3D object model; and
   determining whether the multilayer image is stored, based on a location of the selected point and locations of the plurality of vertices.

4. The method of claim 3, wherein the determining of whether the multilayer image is stored comprises determining whether the selected point is located within a range generated by the plurality of vertices.

5. The method of claim 1, wherein the generating of the multilayer image comprises:
   generating a color camera image from a chroma key screen and the object, the object having different colors applied to a plurality of object parts;
   generating a red, green, blue (RGB) lookup table in which color patch information of the object and object part identification information are recorded;
   verifying color information of a current pixel of the generated color camera image, comparing the verified color information with the RGB lookup table, and searching for object part identification information corresponding to the color information; and
   generating the multilayer image, using the found object part identification information.

6. The method of claim 5, wherein the verifying of the color information of the current pixel of the generated color camera image, the comparing the verified color information with the RGB lookup table, and the searching for the object part identification information corresponding to the color information, comprises:
   reading R, G and B values of the current pixel of the generated color camera image, and verifying the color information;
   determining whether the read R, G and B values are identical to those of the chroma key screen;
   searching for object part identification information corresponding to the R, G and B values, based on the RGB lookup table, and storing the found object part identification information, when the read R, G and B values are determined to be different from those of the chroma key screen.

7. The method of claim 6, wherein the verifying of the color information of the current pixel of the generated color camera image, the comparing the verified color information with the RGB lookup table, and the searching for the object part identification information corresponding to the color information, further comprises:
   determining the verified color information to be a background color, when the read R, G and B values are determined to be identical to those of the chroma key screen.

8. The method of claim 1, wherein the generating of the multilayer image comprises:
   measuring an attribute value of each of a plurality of object parts;
   defining a primitive template, based on the measured attribute value, and generating an object part lookup table, based on the defined primitive template;

generating motion capture data, using a motion capture system;

matching the defined primitive template to each joint of the generated motion capture data; and receiving a depth camera image, and generating an image within a selected depth range, based on the received depth camera image.

9. The method of claim 8, further comprising:

generating a multilayer depth image and a multilayer labeled image from an image within the selected depth range.

10. A non-transitory computer readable recording medium storing a program configured to cause a computer to implement the method of claim 1.

11. A method of generating three-dimensional (3D) volumetric data, the method comprising:

generating of a multilayer image, wherein the generating of the multilayer image comprises:

generating a primitive template 3D object model or a motion-augmented 3D object model, based on motion data and a 3D object model, generating labeled information and depth information, when a pixel corresponding to a current depth value exists in the generated motion-augmented 3D object model or the generated primitive template 3D object model, wherein the labeled information has object part identification information of a part of the object, and generating the multilayer image, using the generated labeled information and the generated depth information;

reading, using a processor, the multilayer image;

performing segmentation on same object part identification information obtained from the read multilayer image;

estimating a location corresponding to the same object part identification information, based on the segmentation;

generating skeleton information, using the estimated location.

12. A non-transitory computer readable recording medium storing a program configured to cause a computer to implement the method of claim 11.

13. A method of generating three-dimensional (3D) volumetric data, the method comprising:

generating, using a processor, a multilayer image by generating at least a slicing-based multilayer image;

generating volume information and an identification of a visible part of an object, based on the generated multilayer image;

generating volume information and an identification of an invisible part of the object, based on the generated multilayer image;

generating motion data by capturing a motion of the object;

generating a 3D object model, the 3D object model including a combination of 3D meshes of the object;

performing retargeting to match the generated motion data to the generated 3D object model; and generating a slicing-based multilayer image, based on a result of the retargeting;

wherein the generating of the slicing-based multilayer image based on the result of the retargeting comprises:

generating a primitive template 3D object model or a motion-augmented 3D object model, based on the motion data and the 3D object model;

generating labeled information and depth information, when a pixel corresponding to a current depth value exists in the generated motion-augmented 3D object model or the generated primitive template 3D object model, wherein the labeled information has object part identification information of a part of the object; and generating the multilayer image, using the generated labeled information and the generated depth information.

14. The method of claim 13, wherein the visible part of the object corresponds to a portion of the object visible formed on a sensor plane of an image sensor capturing the object, and the invisible part of the object corresponds to a portion of the object occluded from sensor plane of the image sensor capturing the object, wherein invisible data is estimate from the visible data generated by the image sensor capturing the visible part of the object.

15. The method of claim 13, wherein the generating of the multilayer image comprises:

capturing a color camera image from a chroma key screen and an object having different colors applied to a plurality of object parts;

reading color values of a current pixel of the captured color camera image;

determining whether the read color values correspond to color values of the chroma key screen;

searching for object part identification information corresponding to the read color values, using a lookup table, and storing the found object part identification information, based upon the determination.

16. The method of claim 15, wherein the generating of the multilayer image further comprises:

checking whether or not the current pixel is a last pixel of the captured color camera image;

when the current pixel is not the last pixel, selecting a next pixel and performing the reading, determining, searching, and storing operations; and when the current pixel is the last pixel, terminating the generation of the multilayer image.

17. A non-transitory computer readable recording medium storing a program configured to cause a computer to implement the method of claim 13.

* * * * *